United States Patent [19]

Hughes et al.

[11] Patent Number: 5,324,352
[45] Date of Patent: Jun. 28, 1994

[54] NON-AQUEOUS PATCHING MIX AND METHOD

[75] Inventors: Gustav O. Hughes, Wilkensburg; Vince Nudo, Pittsburgh, both of Pa.; Nicholas L. Pallotta, Dollard des Orneaux, Canada

[73] Assignee: Indresco Inc., Dallas, Tex.

[21] Appl. No.: 758,535

[22] Filed: Sep. 9, 1991

Related U.S. Application Data

[63] Continuation of Ser. No. 570,194, Aug. 20, 1990, abandoned.

[51] Int. Cl.$^5$ .................... C09D 195/00; C08L 95/00
[52] U.S. Cl. ...................................................... 106/284
[58] Field of Search ........................................... 106/284

[56] References Cited

U.S. PATENT DOCUMENTS

| | | | |
|---|---|---|---|
| 3,729,329 | 4/1973 | Morris et al. | 106/58 |
| 4,276,091 | 6/1981 | Cassens, Jr. | 106/284 |
| 4,792,578 | 12/1988 | Hughes et al. | 523/140 |
| 4,879,319 | 11/1989 | Hughes | 523/139 |
| 4,959,139 | 9/1990 | Blakeburn, II et al. | 106/284 |

FOREIGN PATENT DOCUMENTS 203866 7/1984 Japan .................................. 106/502

OTHER PUBLICATIONS

Grant and Hackh's Chemical Dictionary, Fifth Edition. Pp. 407 and 422 (1987).

*Primary Examiner*—David Brunsman
*Attorney, Agent, or Firm*—John L. Sigalos

[57] ABSTRACT

A non-aqueous refractory maintenance mix made from 100% deadburned magnesite or other basic aggregate plus additions of coal tar pitch and a paraffin distillate oil. This mix is especially useful for the repair and maintenance of BOF, EAF, EBT, and OBT tapholes.

13 Claims, No Drawings

NON-AQUEOUS PATCHING MIX AND METHOD

This application is a continuation of application Ser. No. 07/570,194, filed Aug. 20, 1990, now abandoned.

BACKGROUND OF THE INVENTION

This invention relates to refractory mixes and, more particularly it concerns a basic maintenance mix used for patching and repairing metal exit ports in steel producing vessels, such as tapholes in basic oxygen furnace (BOF) vessels, spouts in eccentric bottom tap (EBT) and off center tap (OBT) vessels, and spouts in electric arc furnaces (EAF).

Repair of a furnace taphole is usually done on a hot furnace free of molten metal. Typically, refractory sleeves are placed in the taphole. The gap between the sleeve and the taphole is variable and must be filled with a refractory material. At the cold face there is usually a 1 to 2 inch gap; at the hot face, a 6 inch gap on each side; and a 12 inch gap above the sleeve. All of the space around the sleeve is filled with a basic maintenance material. Typical downtime for changing a taphole sleeve is 5 to 7 hours. In some instances, it is not possible to repair a furnace with its molten contents emptied, but hot repairs must be done on the "run". It has been found that a maintenance mix which works well for emergency repairs to the taphole is preferred. The usual time required for emergency repairs to a taphole is about 30 minutes.

Conventional methods of filling the void between the taphole and the refractory sleeve involve gunning a magnesite-based patching mix around the sleeve. Because gunable mixes inherently have high levels of flow agents (typically water), after hardening the mixes tend to be of low density and prone to shrinking and cracking. Typically, this type of maintenance patch lasts only a few heats before further patching is required.

Creosote containing patching mixes have also been used as EAF maintenance materials. However, during heatup creosote containing mixes produce offensive fumes which create serious environmental hazards in the work place.

Patching around the sleeves is preferred simply because to replace the entire taphole block after it is worn would require shutting down the entire furnace which usually requires at least 8 to 10 hours of down time. Therefore, for reasons of economics, the industry has developed an inconvenient procedure of frequent repairing of taphole sleeves.

The need clearly exists for a longer lasting maintenance material which requires less frequent repair.

SUMMARY OF THE INVENTION

In accordance with the present invention, a nonaqueous magnesite-based patching mix including pitch and a high boiling point oil is provided by which the above-identified deficiency of frequent patching of EAF, EBT, OBT, and BOF tapholes is overcome. The mix of the present invention inherently has a high viscosity which allows the material to be kneaded into a clot and simply thrown into the taphole block while the furnace is in operation. Once in position, the clot is activated by temperature, the pitch melts, and the mix flows into place. The mix hardens in the presence of heat in about 15-20 minutes. The mix more typically is placed in service by using a pipe as a temporary dam and hand ramming the mix around the pipe which serves as a form. This process is repeated until the repairs are complete.

Among the objects of the present invention are, therefore, the provision of a refractory patching mix and method which greatly increases the number of heats between taphole repairs. Another and more specific object of the present invention is to provide a nonaqueous patching mix including pitch and high boiling point oil. Yet still another object of the present invention is the provision of a non-aqueous patching mix having a high viscosity and which is activated by temperature to facilitate taphole repair. Other objects and further scope of applicability of the present invention will become apparent from the detailed description to follow.

DETAILED DESCRIPTION OF THE PREFERRED EMBODIMENT

Table 1 illustrates the preferred patching mix of the present invention. The base grain is typically deadburned magnesite; however, deadburned dolomite or magnesium aluminate spinel separately, or in combination, could be used as a substitute. The base grain could also be bats (crushed brick) of the aforementioned materials. The base grain should be sized $-4$ mesh through fines. The preferred magnesite base grain should have a magnesia content of at least 90%, preferably 95%. Optionally, flake graphite could be added to the base mix in amounts from 0 to 20 wt. %. The preferred pitch is a pellet pitch sized $-8+50$ mesh, having a softening point of 150° C., and which is derived from coal tar. The preferred oil has a wide boiling point range and has a low viscosity, such as, a distillate product of paraffin which consists mostly of saturated hydrocarbons. The preferred oil further has hydrocarbon numbers predominantly in the range of C15 through C30, and a low vapor pressure at 20° C. of less than 0.08 mm Hg.

TABLE 1

Preferred Taphole Patching Mix
100 wt. % deadburned magnesite
Plus additions:
About 6 wt. % pellet pitch (150° C. coal tar pitch)
About 9 to 9¼ wt. % low viscosity, high boiling point oil

| Screen Analysis of Preferred Mix: | |
| --- | --- |
| Percent held on 4 mesh | 15% |
| Total held on 10 mesh | 50 ± 4% |
| Pass 10 on 28 mesh | 15 |
| Pass 28 on 65 mesh | 7 |
| Pass 65 mesh | 28 ± 4% |
| Pass 150 mesh | 22 |
| Pass 325 mesh | 13 |

In accordance with an exemplary embodiment, the patching mix of the present invention includes 100 wt. % deadburned basic aggregate with additions or binder of about 4 to 12 wt. % pitch, such as, coal tar pitch, and 4 to 12 wt. % low viscosity, high boiling point oil, such as, a paraffinic distillate oil.

Since the patching mix of the present invention is not water-based, it is more compatible with graphite containing refractories which may lie within the vicinity of the patching mix. In addition, prior patching mixes which were water-based could not tolerate graphite or other carbon additions because during heat-up evolution of water vapor could cause oxidation of carbon.

One of the novel features of the present invention is that the use of paraffinic distillate oil provides the ability to cast a mix into furnace cavities over a wide range of temperatures from ambient to 1372° C. (2500° F.). Additionally, the oil has low toxicity and low fume evolution thereby creating a safer working environment.

Service trials have shown that the preferred patching mix of the present invention typically lasts 50 to 100 heats whereas conventional gunning mixes typically only last several heats.

Thus it will be appreciated that as a result of the present invention, a highly effective patching mix and method is provided by which the principal object and others are completely fulfilled. It is contemplated and will be apparent to those skilled in the art from the foregoing description that variations and/or modifications of the disclosed embodiment may be made without departure from the invention. Accordingly, it is expressly intended that the foregoing description is illustrative of a preferred embodiment only, not limiting, and that the true spirit and scope of the present invention be determined by reference to the appended claims.

What is claimed is:

1. A basic refractory maintenance mix consisting essentially of 100 wt. % deadburned basic aggregate, and for each 100 wt. % of said deadburned basic aggregate, from about 4 to 12 wt. % coal tar pitch, and about 4 to 12 wt. % paraffinic distillate consisting essentially of hydrocarbons with hydrocarbon numbers from C15 through C30.

2. The mix of claim 1, wherein said addition of pitch comprises about 6 wt. %.

3. The mix of claim 2, wherein said addition of paraffinic distillate comprises about 9 to 9.5 wt. %.

4. The mix of claim 1, wherein the aggregate consists of deadburned magnesite or deadburned dolomite or combinations thereof.

5. The mix of claim 4, wherein the pitch is a pellet pitch with a softening point of 150° C.

6. The mix of claim 4, wherein at least a portion of said aggregate is in the form of bats.

7. A basic refractory maintenance mix consisting essentially of 100 wt. % deadburned basic aggregate, and for each 100 wt. % of aid deadburned basic aggregate, from about 4 to 12 wt. % pitch, about 0 to 20 wt. % carbon and about 4 to 12 wt. % paraffinic distillate consisting essentially of hydrocarbons with hydrocarbon numbers from C15 through C30.

8. The mix of claim 7, wherein said pitch comprises about 6 wt. %.

9. The mix of claim 7, wherein said paraffinic distillate comprises about 9 to 9.5 wt. %.

10. The mix of claim 7, wherein said deadburned basic aggregate is deadburned magnesite or deadburned dolomite or combinations thereof.

11. The mix of claim 10, wherein at least a portion of said deadburned basic aggregate is in the form of bats.

12. The mix of claim 7, wherein the pitch is a pellet pitch with a softening point of 150° C.

13. The mix of claim 7, wherein the carbon is flake graphite.

* * * * *